United States Patent
Yao

(10) Patent No.: US 11,142,632 B2
(45) Date of Patent: Oct. 12, 2021

(54) RESIN COMPOSITION AND MOLDED RESIN OBJECT

(71) Applicant: Eastman Chemical Company, Kingsport, TN (US)

(72) Inventor: Kenji Yao, Minamiashigara (JP)

(73) Assignee: Eastman Chemical Company, Kingsport, TN (US)

(*) Notice: Subject to any disclaimer, the term of this patent is extended or adjusted under 35 U.S.C. 154(b) by 5 days.

(21) Appl. No.: 16/535,390

(22) Filed: Aug. 8, 2019

(65) Prior Publication Data

US 2019/0375916 A1 Dec. 12, 2019

Related U.S. Application Data

(63) Continuation of application No. PCT/JP2018/005136, filed on Feb. 14, 2018.

(30) Foreign Application Priority Data

Jul. 11, 2017 (JP) .............................. JP2017-135758
Jul. 11, 2017 (JP) .............................. JP2017-135759

(51) Int. Cl.
| | | |
|---|---|---|
| *C08L 1/12* | (2006.01) | |
| *B29C 45/00* | (2006.01) | |
| *C08K 5/00* | (2006.01) | |
| *C08K 5/101* | (2006.01) | |
| *C08K 5/3432* | (2006.01) | |
| *C08K 7/02* | (2006.01) | |
| *C08L 1/20* | (2006.01) | |
| *B29K 1/00* | (2006.01) | |

(52) U.S. Cl.
CPC ............ *C08L 1/12* (2013.01); *B29C 45/0001* (2013.01); *C08K 5/0016* (2013.01); *C08K 5/101* (2013.01); *C08K 5/3432* (2013.01); *C08K 7/02* (2013.01); *C08L 1/20* (2013.01); *B29K 2001/12* (2013.01)

(58) Field of Classification Search
None
See application file for complete search history.

(56) References Cited

U.S. PATENT DOCUMENTS

2017/0218183 A1  8/2017  Yao

FOREIGN PATENT DOCUMENTS

| JP | 2002-069208 A | | 3/2002 |
|---|---|---|---|
| JP | 2010-126637 A | | 6/2010 |
| JP | 2010-194790 A | | 9/2010 |
| JP | 2010194790 A | * | 9/2010 |
| JP | 2011-148914 A | | 8/2011 |
| JP | 4882793 B2 | | 2/2012 |
| JP | 2017-025206 A | | 2/2017 |
| JP | 2017-043647 A | | 3/2017 |
| JP | 2017-043648 A | | 3/2017 |
| JP | 2017-137392 A | | 8/2017 |

OTHER PUBLICATIONS

May 15, 2018 International Search Report issued in International Patent Application No. PCT/JP2018/005136.
May 15, 2018 Written Opinion of the International Searching Authority issued in International Patent Application No. PCT/JP2018/005136.

* cited by examiner

*Primary Examiner* — Peter A Salamon
(74) *Attorney, Agent, or Firm* — C. Stuart Everett; Robert C. Morriss

(57) ABSTRACT

A resin composition includes: a cellulose acetate propionate and cellulose fibers in which a part or all of primary hydroxyl groups of glucose moieties are oxidized into a carboxylic acid, the cellulose fibers having an average fiber diameter of 1 to 8 nm.

9 Claims, No Drawings

RESIN COMPOSITION AND MOLDED RESIN OBJECT

CROSS-REFERENCE TO RELATED APPLICATIONS

This is a continuation of International Application No. PCT/JP2018/005136 filed on Feb. 14, 2018, and claims a priority under 35 USC 119 from Japanese Patent Application No. 2017-135758 filed on Jul. 11, 2017 and Japanese Patent Application No. 2017-135759 filed on Jul. 11, 2017.

BACKGROUND

Technical Field

The present invention relates to a resin composition and a molded resin object.

Related Art

Various resin compositions have hitherto been proposed and are used in various applications. Resin compositions are used especially as various components, housings, etc. of domestic electrical products and motor vehicles. Thermoplastic resins are used also as components, including housings, of business machines and electronic/electrical appliances.

Nowadays, resins derived from plants are utilized. One kind of conventionally known plant-derived resins is cellulose derivatives.

For example, Japanese Patent No. 4882793 discloses "an optical film which includes a film comprising a composition constituted of acetylated cellulose containing cellulose nanofibers and which is characterized in that the film has been biaxially stretched".

SUMMARY

There have been cases where films obtained from resin compositions obtained by incorporating cellulose fibers having a fiber diameter on the order of nanometer into acetylated cellulose have insufficient impact strength because of the low brittleness thereof and where these films show a large dimensional change upon water absorption because of the high hygroscopicity thereof.

Aspects of non-limiting embodiments of the present disclosure relate to a resin composition which includes a cellulose acylate and cellulose fibers and which gives molded resin objects excellent in terms of tensile modulus and impact strength, as compared with the case where the cellulose fibers have a fiber diameter less than 1 nm or exceeding 8 nm.

Aspects of non-limiting embodiments of the present disclosure relate to a resin composition which includes a cellulose acylate and cellulose fibers and which gives molded resin objects inhibited from dimensionally changing upon water absorption, as compared with the case where the cellulose fibers have a fiber diameter less than 1 nm or exceeding 8 nm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin composition including
a cellulose acetate propionate and
cellulose fibers in which a part or all of primary hydroxyl groups of glucose moieties are oxidized into a carboxylic acid, the cellulose fibers having an average fiber diameter of 1 to 8 nm.

DETAILED DESCRIPTION

Exemplary embodiments of the resin compositions and molded resin objects of the present invention are explained below.

<Resin Compositions>

The resin compositions according to exemplary embodiment include: cellulose acetate propionate or cellulose acetate; and cellulose fibers in which a part or all of primary hydroxyl groups of glucose moieties are oxidized into a carboxylic acid and, which have an average fiber diameter of 1 to 8 nm.

Hereinafter, the cellulose fibers in which a part or all of primary hydroxyl groups of glucose moieties are oxidized into a carboxylic acid and, which have an average fiber diameter of 1 to 8 nm are often referred to as "specific cellulose fibers".

Cellulose fibers having fiber diameters on the order of nanometer (hereinafter often referred to as "cellulose nanofibers") are a natural material and are hence a material friendly to the global environment. Cellulose nanofibers, when composited with a resin composition, are capable of attaining higher strength and higher modulus, and are hence expected to be increasingly used in applications where strength enhancement, weight reduction, etc. are desired.

Since cellulose nanofibers undesirably decompose at temperatures of 200° C. and higher, polypropylene, which has a low melting point, is generally used as a resin ingredient (matrix resin) to be mixed with the cellulose nanofibers. However, polypropylene, for example, has the following properties: polypropylene itself has low strength; and polypropylene has a low affinity for cellulose nanofibers. Because of this, the resin composition obtained by incorporating cellulose nanofibers into polypropylene is low in interfacial adhesion between the polypropylene and the cellulose nanofibers and low in the dispersibility of the cellulose nanofibers. Molded resin objects obtained therefrom hence tend to have low strength.

Meanwhile, cellulose acylates (acylated cellulose derivatives) in which a part of the hydroxyl groups is substituted with acyl groups are a material obtained from inedible resources and are primary derivatives, production of which necessitates no chemical polymerization. The cellulose acylates are hence a resinous material friendly to the environment. Because of the tenacious hydrogen bonding thereof, the cellulose acylates have a high modulus among resinous materials. Furthermore, because of the alicyclic structure thereof, the cellulose acylates have the merit of having high transparency. For example, acetylated cellulose has high strength by itself and further has a high affinity for cellulose nanofibers. Acetylated cellulose is hence expected to attain higher strength.

Japanese Patent No. 4882793, for example, proposes an optical film which includes a film comprising a composition constituted of acetylated cellulose containing cellulose nanofibers and in which the film has been biaxially stretched. Japanese Patent No. 4882793 indicates that the optical film has improved tear strength and can be inhibited from breaking.

However, the technique has a drawback in that the composition not only has low impact strength because of the low brittleness but also shows a large dimensional change upon water absorption because of the high hygroscopicity and, hence, use of the composition in applications other than films is often difficult.

In contrast, one of the resin compositions according to exemplary embodiment, due to the configuration including cellulose acetate propionate and specific cellulose fibers, gives molded resin objects excellent in terms of tensile modulus and impact strength. Although uncertain, the reason therefor is presumed to be as follows.

Cellulose acetate propionate, among acylated celluloses, has hydroxyl groups, acetyl groups, and propionyl groups. Since these groups are side chains differing in length, it is thought that large spaces are apt to be formed between the molecules. Because of this, among the large spaces to be formed between the molecules, the spaces which are apt to be formed are ones surrounding the hydroxyl groups, which are the shortest side chains. Consequently, the specific cellulose fibers, in which primary hydroxyl groups are oxidized into a carboxylic acid, are apt to approach those hydroxyl groups. Furthermore, since the specific cellulose fibers have an average fiber diameter of 1 to 8 nm, it is thought that the specific cellulose fibers, in a kneading step for compositing cellulose acetate propionate with the specific cellulose fibers, are less apt to suffer secondary aggregation and are in the state of being easy to move. It is thought that as a result, the specific cellulose fibers are satisfactorily dispersed and masses of fibers are formed in the periphery of the hydroxyl groups, making it possible to attain higher tensile modulus and higher impact strength.

It is presumed that for the reason shown above, a molded resin object excellent in terms of tensile modulus and impact strength is obtained by mixing cellulose acetate propionate with specific cellulose fibers.

The other of the resin compositions according to exemplary embodiment, due to the configuration including cellulose acetate and specific cellulose fibers, gives molded resin objects inhibited from dimensionally changing upon water absorption. Although uncertain, the reason therefor is presumed to be as follows.

The specific cellulose fibers are cellulose fibers in which a part or all of the primary hydroxyl groups of glucose moieties are oxidized into a carboxylic acid. The carboxylic acid and the hydroxyl groups or acetyl groups of cellulose acetate hence ionically attract each other in a kneading step for combining the cellulose acetate with the specific cellulose fibers. Furthermore, since the specific cellulose fibers have a fiber diameter of 1 to 8 nm, the specific cellulose fibers easily move in the kneading step and are apt to be inhibited from undergoing secondary aggregation. It is thought that the specific cellulose fibers hence come into an approximately evenly dispersed state, thereby inhibiting the dimensional change caused by water absorption.

It is presumed that for the reason shown above, a molded resin object inhibited from dimensionally changing upon water absorption is obtained by mixing cellulose acetate with specific cellulose fibers.

The components of the resin compositions according to exemplary embodiment are explained below in detail.

[Cellulose Acetate Propionate]

Cellulose acetate propionate is a cellulose derivative in which a part of the hydroxyl groups is substituted by acetyl groups and propionyl groups. Specifically, cellulose acetate propionate is a cellulose derivative represented by the following general formula (1).

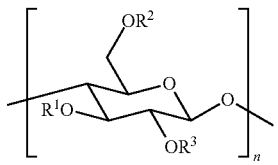

General Formula (1)

In general formula (1), $R^1$, $R^2$, and $R^3$ each independently represent a hydrogen atom, an acetyl group, or a propionyl group, and n represents an integer of 2 or larger. However, at least a part of the n $R^1$s, n $R^2$s, and n $R^3$s represent acetyl and propionyl groups.

There are no particular limitations on the range of n in general formula (1), and the range may be determined in accordance with the range of weight-average molecular weight. The range of n in general formula (1) is, for example, preferably 50 to 900.

—Weight-average Molecular Weight—

The weight-average molecular weight of the acetyl propionyl cellulose is, for example, preferably 10,000 to 250,000, more preferably 30,000 to 200,000.

The weight-average molecular weight (Mw) is determined by examining the acetyl propionyl cellulose with a gel permeation chromatography device (GPC device HLC-8320GPC, manufactured by Tosoh Corp.; column, TSKgelα-M) using dimethylacetamide/lithium chloride=90/10 solution and calculation for polystyrene.

—Content of Propionyl Groups—

In the cellulose acetate propionate, the content of propionyl groups based on the cellulose acetate propionate is desirably 39 to 51% by mass, preferably 40 to 50% by mass, more preferably 41 to 49% by mass, from the standpoint of making the resin composition easily give molded resin objects excellent in terms of tensile modulus and impact strength.

—Content of Acetyl Groups—

In the cellulose acetate propionate, the content of acetyl groups based on the cellulose acetate propionate is, for example, desirably 0.1 to 10% by mass, preferably 0.5 to 5% by mass.

—Ratio Between Propionyl Group Content and Acetyl Group Content—

In cases when the content of propionyl groups is expressed by ($M_{Pr}$) and the content of acetyl groups is expressed by ($M_{Ac}$), then the content ratio ($M_{Ac}$)/($M_{Pr}$) between the content of propionyl groups ($M_{Pr}$) and the content of acetyl groups ($M_{Pr}$) is desirably from 0.005 to 0.1, preferably from 0.01 to 0.07 by mass.

The content of propionyl groups and the content of acetyl groups are determined by the following method.

A peak assigned to acetyl group, a peak assigned to propionyl group, and a peak assigned to hydroxyl group are determined with a $H^1$-NMR apparatus (JMN-ECA, manufactured by JEOL RESONANCE Inc.), and the content of propionyl groups and the content of acetyl groups are calculated from the integrals of the peaks.

The content ratio ($M_{Ac}$)/($M_{Pr}$) by mass between the content of propionyl groups and the content of acetyl groups is determined from the contents of the two kinds of groups determined by that method.

—Degree of Polymerization—

From the standpoint of making it easy to obtain molded resin objects excellent in terms of tensile modulus and impact strength, the degree of polymerization of the cellulose acetate propionate is desirably 50 to 900, preferably 50 to 700, more preferably 55 to 650, even more preferably 55 to 600.

The degree of polymerization is determined from weight-average molecular weight in the following manner.

First, the weight-average molecular weight of the cellulose acetate propionate is determined by the method described above. Subsequently, the weight-average molecular weight is divided by the molecular weight of the constituent unit of the cellulose acetate propionate, thereby determining the degree of polymerization of the cellulose acetate propionate.

Processes for producing the cellulose acetate propionate are not particularly limited. Examples thereof include a process in which cellulose is subjected to acylation and molecular-weight reduction (depolymerization) and optionally to deacetylation. Alternatively, a commercial product of cellulose acetate propionate may be subjected to molecular-weight reduction (depolymerization) or the like so as to result in a predetermined weight-average molecular weight, thereby producing the cellulose acetate propionate to be used in the invention.

[Cellulose Acetate]

Cellulose acetate is a cellulose derivative in which at least a part of the hydroxyl groups is substituted with acetyl groups, and specifically is a cellulose derivative represented by the following general formula (2).

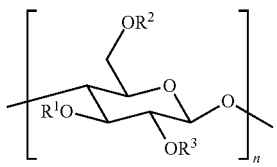

General Formula (2)

In general formula (2), $R^1$, $R^2$, and $R^3$ each independently represent a hydrogen atom or an acetyl group, and n represents an integer of 2 or larger. However, at least a part of the n $R^1$s, n $R^2$s, and n $R^3$s represent acetyl group.

There are no particular limitations on the range of n in general formula (2), and the range may be determined in accordance with the desired range of weight-average molecular weight. The range of n in general formula (2) is, for example, preferably 120 to 330.

—Weight-Average Molecular Weight—

The weight-average molecular weight of the cellulose acetate is, for example, desirably 40,000 to 90,000, preferably 60,000 to 80,000.

The weight-average molecular weight (Mw) is determined by examining the cellulose acetate with a gel permeation chromatography device (GPC device HLC-8320GPC, manufactured by Tosoh Corp.; column, TSKgelα-M) using dimethylacetamide/lithium chloride=90/10 solution and calculation for polystyrene.

—Degree of Substitution—

From the standpoint of facilitating the control of dimensional change due to water absorption, the degree of substitution of the cellulose acetate is desirably 2.1 to 2.6, preferably 2.15 to 2.6, more preferably 2.2 to 2.5, even more preferably 2.2 to 2.45.

The degree of substitution herein is an index to the degree in which hydroxyl groups of the cellulose is substituted by acetyl groups. Namely, the degree of substitution is an index to the degree of acetylation of the cellulose acetate. Specifically, the term "degree of substitution" means an intramolecular average number of hydroxyl groups substituted by acetyl groups, of the three hydroxyl groups of the D-glucopyranose unit of the cellulose acetate.

The degree of substitution is determined from a ratio of a peak integral of cellulose-derived hydrogen to a peak integral of an acetyl group-derived hydrogen with a $H^1$-NMR apparatus (JMN-ECA, manufactured by JEOL RESONANCE Inc.). For example, the molecular weight of the constituent unit of cellulose acetate is 263 when the degree of substitution with acetyl groups is 2.4, and is 284 when the degree of substitution with acetyl groups is 2.9.

A range of the degree of polymerization of the cellulose acetate is preferably 100 to 350, more preferably 120 to 330, even more preferably 160 to 300. In cases when the degree of polymerization of the cellulose acetate is within such ranges, it is easy to obtain molded resin objects inhibited from dimensionally changing upon water absorption.

The degree of polymerization of the cellulose acetate is determined from weight-average molecular weight in the following manner.

First, the weight-average molecular weight of the cellulose acetate is determined by the method described above. Subsequently, the weight-average molecular weight is divided by the molecular weight of the constituent unit of the cellulose acetate, thereby determining the degree of polymerization of the cellulose acetate.

Examples of the cellulose acetate include monoacetyl cellulose, diacetyl cellulose, and triacetyl cellulose. One cellulose acetate may be used alone, or two or more cellulose acetates may be used in combination.

Processes for producing the cellulose acetate are not particularly limited. For example, a preferred production process is one in which cellulose is subjected to acetylation and molecular-weight reduction (depolymerization) and optionally to deacetylation. Alternatively, a commercial product of cellulose acetate may be subjected to molecular-weight reduction (depolymerization) or the like so as to result in a predetermined weight-average molecular weight, thereby producing the cellulose acetate to be used in the invention.

[Specific Cellulose Fibers]

The resin compositions according to exemplary embodiment contain cellulose fibers (specific cellulose fibers) in which a part or all of primary hydroxyl groups of glucose moieties are oxidized into a carboxylic acid and, which have an average fiber diameter of 1 to 8 nm. Namely, the specific cellulose fibers are cellulose fibers in which a part or all of the primary hydroxyl groups of the glucose moieties are oxidized into carboxy groups and converted to a carboxylic acid and which have an average fiber diameter of 1 to 8 nm.

(Average Fiber Diameter)

The average fiber diameter of the specific cellulose fibers is preferably 4 to 8 nm, more preferably 4 to 7 nm, from the standpoints of obtaining molded resin objects excellent in terms of tensile modulus and impact strength and of obtaining molded resin objects inhibited from dimensionally changing upon water absorption. In addition, in cases when the average fiber diameter thereof is within such ranges, the specific cellulose fibers are apt to have improved dispersibility. This makes it easy to obtain molded resin objects having excellent transparency.

The average fiber diameter of the specific cellulose fibers is calculated by the following method.

The cellulose fibers are dispersed in methylene chloride using a ball mill, and the methylene chloride is vaporized. Subsequently, a photograph having a magnification of 1,000 diameters is taken with an electron microscope, and 100 cellulose fiber images are selected from the photograph. The width (diameter) of each of the fiber images is measured to calculate an average fiber diameter in terms of number-average diameter.

With respect to the specific cellulose fibers present in a resin composition, the average fiber diameter of the specific cellulose fibers is determined in the following manner. The resin composition to be examined is dissolved in tetrahydrofuran, and the cellulose fibers remaining undissolved are recovered. The recovered cellulose fibers are examined by the method for determining average fiber diameter described above to calculate the average fiber diameter.

The specific cellulose fibers are not particularly limited so long as a part or all of primary hydroxyl groups of glucose moieties are oxidized into a carboxylic acid. It is desirable that the specific cellulose fibers are produced by oxidizing cellulose fibers using an N-oxyl compound such as, for example, 2,2,6,6-tetramethylpipenidyl-1-oxy radical (hereinafter often referred to as "TEMPO") as a catalyst. The N-oxyl compound is a compound capable of generating a nitroxy radical, and examples thereof include TEMPO and TEMPO derivatives (e.g., TEMPO derivatives obtained by substituting TEMPO at the 4-position with an acetamide group, carboxy group, phosphonooxy group, hydroxyl group, etc.). It is preferred to use TEMPO, among these, as a catalyst.

(Degree of Oxidation of Specific Cellulose Fibers)

The specific cellulose fibers have a degree of oxidation of desirably 95% or higher, preferably 97% or higher.

The degree of oxidation, in which the primary hydroxyl groups of the glucose moieties in the specific cellulose fibers present in a resin composition are oxidized into a carboxylic acid, is determined in the following manner.

First, the resin composition to be examined is dissolved in tetrahydrofuran. The cellulose fibers remaining undissolved are recovered and examined with a $H^1$-NMR apparatus (JMN-ECA, manufactured by JEOL RESONANCE Inc.). Peak assignment is performed to identify one assigned to the hydrogen derived from the glucose primary hydroxyl group, one assigned to the hydrogen derived from the glucose secondary hydroxyl groups, and one assigned to the carboxylic acid, and the degree of oxidation is determined from a ratio among the integrals of the peaks.

For ascertaining that specific cellulose fibers are contained in a resin composition according to exemplary embodiment, the following method, for example, is used. The resin composition to be examined is dissolved in tetrahydrofuran, and the cellulose fibers remaining undissolved are recovered. The recovered cellulose fibers are dispersed in water and the pH thereof is measured. In the case where specific cellulose fibers are contained, the pH is in the range of 3 to 6.

(Process for Producing Specific Cellulose Fibers)

Processes for obtaining specific cellulose fibers are not particularly limited, and examples thereof include a known process. Specifically, a process including the step of oxidizing cellulose fibers (oxidation step) is desirable. The process for obtaining specific cellulose fibers preferably further includes the step of fibrillating the oxidized cellulose fibers (fibrillation step).

—Oxidation Step—

The step of oxidizing cellulose fibers is a step in which cellulose fibers are treated in an aqueous-medium solution containing the N-oxyl compound (TEMPO or a TEMPO derivative), an alkali halide, and an oxidizing agent, thereby oxidizing the cellulose fibers. That is, in this step, a part or all of the primary hydroxyl groups of the glucose moieties are oxidized into a carboxylic acid.

The cellulose fibers are not particularly limited. Examples thereof include: wood pulps such as softwood pulp and hardwood pulp; cotton pulps such as cotton linter and cotton lint; non-wood pulps such as pulps obtained from straw of barley, wheat, and the like and bagasse pulp; bacteria cellulose; cellulose isolated from sea squirt; and cellulose isolated from seaweeds.

The alkali halide is not particularly limited. Examples thereof include alkali fluorides, alkali bromides, alkali chlorides, and alkali iodides. Especially desirable among these is sodium bromide.

Examples of the oxidizing agent include sodium hypochlorite, sodium chlorite, sodium hypobromite, and sodium bromite. Especially desirable among these is sodium hypochlorite.

Examples of the aqueous medium include water and a mixed medium composed of water and an organic solvent which dissolves in water. Preferred of these is water. The term "organic solvent which dissolves in water" means an organic solvent which dissolves in water in an amount of at least 1% by mass at 25° C.

The reaction temperature is not particularly limited. The reaction temperature is, for example, desirably 4 to 40° C. from the standpoint of causing the reaction to proceed efficiently.

The pH of the reaction system during the reaction is not particularly limited. From the standpoint of causing the oxidation reaction to proceed efficiently, it is desirable to regulate the pH of the reaction system so as to be in the range of, for example, 8 to 12 using an alkaline solution such as an aqueous sodium hydroxide solution.

The reaction time is not particularly limited, and is set in accordance with the progress of the oxidation. For example, the reaction time is desirably 0.5 to 6 hours.

—Fibrillation Step—

The fibrillation step is a step in which the oxidized cellulose fibers are dispersed, while being fibrillated, in an aqueous medium using mechanical shear force, thereby obtaining specific cellulose fibers.

In the fibrillation step, the oxidized cellulose fibers may be separated from the aqueous medium and then washed with water. In this case, the oxidized cellulose fibers may be newly mixed with an aqueous medium and dispersed, while being fibrillated, in the aqueous medium.

Devices usable in the fibrillation step are not particularly limited. For example, use can be made of fibrillation devices such as various mixers, ultrasonic homogenizers, high-pressure homogenizers, extra-high-pressure homogenizers, twin-screw kneaders, and stone mills. From the standpoint of efficiently fibrillating the oxidized cellulose fibers, it is preferred to use, among these, a high-pressure or extra-high-pressure homogenizer of the wet process type which is capable of applying a pressure of 50 MPa or higher.

[Mass Ratio Between Cellulose Acetate Propionate and Specific Cellulose Fibers]

From the standpoint of enabling a resin composition according to exemplary embodiment to easily give molded resin objects excellent in terms of tensile modulus and impact strength, the resin composition desirably is one in which the mass ratio (A)/(B) of the mass (A) of the cellulose acetate propionate or the cellulose acetate to the mass (B) of the specific cellulose fibers is from 10 to 1,000. The mass ratio (A)/(B) is preferably from 10 to 900, more preferably from 10 to 500, even more preferably from 20 to 200, especially preferably from 20 to 100.

[Contents of Cellulose Acetate Propionate and Specific Cellulose Fibers]

From the standpoint of easily obtaining molded resin objects excellent in terms of tensile modulus and impact strength, the content of the cellulose acetate propionate,

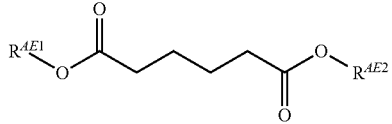

General Formula (AE-1)

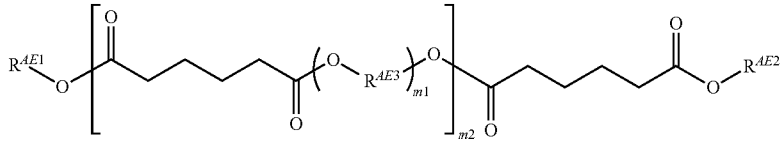

General Formula (AE-2)

based on the whole resin composition, is desirably 60% by mass or higher, preferably 65% by mass or higher, more preferably 70% by mass or higher, even more preferably 80% by mass or higher. The content thereof is desirably 99.9% by mass or less, preferably 95% by mass or less, more preferably 90% by mass or less.

From the same standpoint, the content of the specific cellulose fibers is desirably 0.1% by mass or higher, preferably 1% by mass or higher, more preferably 5% by mass or higher, even more preferably 10% by mass or higher. The content thereof is desirably 40% by mass or less, preferably 35% by mass or less, more preferably 30% by mass or less, even more preferably 20% by mass or less.

The total content of the cellulose acetate propionate and the specific cellulose fibers, based on the whole resin composition, is desirably 80% by mass or higher, preferably 90% by mass or higher, and may be 100% by mass.

[Other Ingredients] (Plasticizer)

The resin compositions according to exemplary embodiment may further contain a plasticizer.

Examples of the plasticizer include adipic-ester-containing compounds, polyetherester compounds, polyphosphate ester compounds, sebacic acid ester compounds, glycol ester compounds, acetic acid ester compounds, dibasic-acid ester compounds, phosphoric acid ester compounds, phthalic acid ester compounds, camphor, citric acid ester compounds, stearic acid ester compounds, metal soaps, polyol compounds such as polyester polyols, and poly(alkylene oxide) compounds.

Desirable of these is any one compound selected from the group consisting of adipic-ester-containing compounds, polyetherester compounds, and polyester polyols. Preferred is any one compound selected from among adipic-ester-containing compounds and polyester polyols.

—Adipic-Ester-containing Compounds—

The term "adipic-ester-containing compounds (compounds containing an adipic acid ester)" means compounds consisting of adipic acid esters alone or a mixture of an adipic acid ester with an ingredient which is not an adipic acid ester (with a compound different from any adipic acid ester). However, desirable adipic-ester-containing compounds are ones in which an adipic acid ester is contained in an amount of 50% by mass or more based on all the ingredients.

Examples of the adipic acid ester include adipic acid diesters and poly(adipic acid ester)s. Specifically, examples thereof include adipic acid diesters represented by the following general formula (AE-1) and poly(adipic acid ester)s represented by the following general formula (AE-2).

In general formulae (AE-1) and (AE-2), $R^{AE1}$ and $R^{AE2}$ each independently represent an alkyl group or a polyoxyalkyl group $[-(C_xH_{2x}-O)_y-R^{A1}]$ (where $R^{A1}$ represents an alkyl group, x represents an integer of 1 to 6, and y represents an integer of 1 to 6).

$R^{AE3}$ represents an alkylene group.

Symbol m1 represents an integer of 1 to 5.

Symbol m2 represents an integer of 1 to 10.

In general formulae (AE-1) and (AE-2), the alkyl groups represented by $R^{AE1}$ and $R^{AE2}$ preferably are alkyl groups having 1 to 6 carbon atoms, and more preferably are alkyl groups having 1 to 4 carbon atoms. The alkyl groups represented by $R^{AE1}$ and $R^{AE2}$ may be either linear, branched, or cyclic, but preferably are linear or branched.

In the polyoxyalkyl group $[-(C_xH_{2x}-O)_y-R^{A1}]$ represented by each of $R^{AE1}$ and $R^{AE2}$ in general formulae (AE-1) and (AE-2), the alkyl group represented by $R^{A1}$ preferably is an alkyl group having 1 to 6 carbon atoms, and more preferably is an alkyl group having 1 to 4 carbon atoms. The alkyl group represented by $R^{A1}$ may be either linear, branched, or cyclic, but preferably is linear or branched. Symbol x represents an integer of 1 to 6. Symbol y represents an integer of 1 to 6.

In general formula (AE-2), the alkylene group represented by $R^{AE3}$ preferably is an alkylene group having 1 to 6 carbon atoms, and more preferably is an alkylene group having 1 to 4 carbon atoms. The alkylene group may be either linear, branched, or cyclic, but preferably is linear or branched.

In general formulae (AE-1) and (AE-2), the groups represented by the respective symbols may be substituted with substituents. Examples of the substituents include alkyl groups, aryl groups, and hydroxyl group.

The molecular weight (or weight-average molecular weight) of the adipic acid ester is preferably 100 to 10,000, more preferably 200 to 3,000. The values of weight-average molecular weight are determined by the same method as that used for determining the weight-average molecular weight of polyetherester compounds described above.

Specific examples of the adipic-ester-containing compounds are shown below, but the adipic-ester-containing compounds are not limited to the following examples.

| Substance name | Product name | Manufacturer |
|---|---|---|
| ADP1 | adipic acid diester | Daifatty-101 | Daihachi Chemical Industry |
| ADP2 | adipic acid diester | ADK Cizer RS-107 | ADEKA |
| ADP3 | poly(adipic acid ester) | Polycizer W-230-H | DIC |

—Polyetherester Compounds—

Examples of the polyetherester compounds include polyetherester compounds represented by general formula (EE).

General Formula (EE)

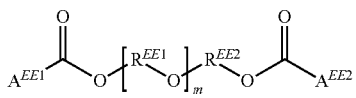

In general formula (EE), $R^{EE1}$ and $R^{EE2}$ each independently represent an alkylene group having 2 to 10 carbon atoms. $A^{EE1}$ and $A^{EE2}$ each independently represent an alkyl group having 1 to 6 carbon atoms, an aryl group having 6 to 12 carbon atoms, or an aralkyl group having 7 to 18 carbon atoms. Symbol m represents an integer of 1 or larger.

In general formula (EE), the alkylene group represented by $R^{EE1}$ preferably is an alkylene group having 3 to 10 carbon atoms, and more preferably is an alkylene group having 3 to 6 carbon atoms. The alkylene group represented by $R^{EE1}$ may be either linear, branched, or cyclic, but preferably is linear.

In cases when the alkylene group represented by $R^{EE1}$ has 3 or more carbon atoms, the resin composition is inhibited from decreasing in flowability and is apt to exhibit thermoplasticity. In cases when the alkylene group represented by $R^{EE1}$ has 10 or less carbon atoms or is linear, this polyetherester compound is apt to have an enhanced affinity for the cellulose acetate propionate or cellulose acetate. Consequently, by using a polyetherester compound in which the alkylene group represented by $R^{EE1}$ is linear and has carbon atoms in a number within that range, the moldability of the resin composition is improved.

From these standpoints, the alkylene group represented by $R^{EE1}$ especially preferably is an n-hexylene group ($—(CH_2)_6—$). Namely, preferred polyetherester compounds are ones in which $R^{EE1}$ represents an n-hexylene group ($—(CH_2)_6—$).

In general formula (EE), the alkylene group represented by $R^{EE2}$ preferably is an alkylene group having 3 to 10 carbon atoms, and more preferably is an alkylene group having 3 to 6 carbon atoms. The alkylene group represented by $R^{EE2}$ may be either linear, branched, or cyclic, but preferably is linear.

In cases when the alkylene group represented by $R^{EE2}$ has 3 or more carbon atoms, the resin composition is inhibited from decreasing in flowability and is apt to exhibit thermoplasticity. In cases when the alkylene group represented by $R^{EE2}$ has 10 or less carbon atoms or is linear, this polyetherester compound is apt to have an enhanced affinity for the cellulose acetate propionate or cellulose acetate. Consequently, by using a polyetherester compound in which the alkylene group represented by $R^{EE2}$ is linear and has carbon atoms in a number within that range, the moldability of the resin composition is improved.

From these standpoints, the alkylene group represented by $R^{EE2}$ especially preferably is an n-butylene group ($—(CH_2)_4—$). Namely, preferred polyetherester compounds are ones in which $R^{EE2}$ represents an n-butylene group ($—(CH_2)_4—$).

In general formula (EE), the alkyl groups represented by $A^{EE1}$ and $A^{EE2}$ are alkyl groups having 1 to 6 carbon atoms, and more preferably are alkyl groups having 2 to 4 carbon atoms. The alkyl groups represented by $A^{EE1}$ and $A^{EE2}$ may be either linear, branched, or cyclic, but preferably are branched.

The aryl groups represented by $A^{EE1}$ and $A^{EE2}$ are aryl groups having 6 to 12 carbon atoms. Examples thereof include unsubstituted aryl groups such as phenyl and naphthyl and substituted phenyl groups such as t-butylphenyl and hydroxyphenyl.

The aralkyl groups represented by $A^{EE1}$ and $A^{EE2}$ are groups represented by $—R^4-Ph$. $R^4$ represents a linear or branched alkylene group having 1 to 6 carbon atoms (preferably 2 to 4 carbon atoms). Ph represents an unsubstituted phenyl group or a phenyl group substituted with one or more, linear or branched alkyl groups having 1 to 6 carbon atoms (preferably 2 to 6 carbon atoms). Specific examples of the aralkyl groups include unsubstituted aralkyl groups such as benzyl, phenylmethyl (phenethyl), phenylpropyl, and phenylbutyl and substituted aralkyl groups such as methylbenzyl, dimethylbenzyl, and methylphenethyl.

It is preferable that $A^{EE1}$ and/or $A^{EE2}$ represents an aryl group or an aralkyl group. Namely, the polyetherester compounds preferably are compounds in which $A^{EE1}$ and/or $A^{EE2}$ represents an aryl group (preferably phenyl) or an aralkyl group, and preferably are compounds in which $A^{EE1}$ and $A^{EE2}$ both represent an aryl group (preferably phenyl) or an aralkyl group.

Next, properties of the polyetherester compounds are explained.

The weight-average molecular weight (Mw) of the polyetherester compounds is preferably 450 to 650, more preferably 500 to 600.

Polyetherester compounds having a weight-average molecular weight (Mw) of 450 or higher are less apt to bleed out (phenomenon in which a component separates out). Polyetherester compounds having a weight-average molecular weight (Mw) of 650 or less are apt to have an enhanced affinity for the cellulose acetate propionate or cellulose acetate. Consequently, by using a polyetherester compound having a weight-average molecular weight (Mw) within that range, the moldability of the resin composition is improved.

The values of weight-average molecular weight (Mw) of the polyetherester compounds are ones determined by gel permeation chromatography (GPC). Specifically, a measurement for molecular weight determination by GPC is conducted using HPLC1100, manufactured by Tosoh Corp., as a measuring apparatus and TSKgel GMHHR-M plus TSKgel GMHHR-M (7.8 mm I.D. 30 cm), manufactured by Tosoh Corp., as columns, and using chloroform solvent. The weight-average molecular weight is calculated from the results of the measurement using a molecular-weight calibration curve produced with monodisperse-polystyrene standard samples.

The viscosity at 25° C. of the polyetherester compounds is preferably 35 to 50 mPa·s, more preferably 40 to 45 mPa·s.

Polyetherester compounds having a viscosity of 35 mPa·s or higher are apt to have improved dispersibility in the cellulose acetate propionate or cellulose acetate. Polyetherester compounds having a viscosity of 50 mPa·s or less are less apt to have dispersion anisotropy. Consequently, by using a polyetherester compound having a viscosity within that range, the moldability of the resin composition is improved.

The values of viscosity are ones measured with an E-type viscometer.

The solubility parameter (SP value) of the polyetherester compounds is preferably 9.5 to 9.9, more preferably 9.6 to 9.8.

Polyetherester compounds having a solubility parameter (SP value) of 9.5 to 9.9 are apt to have improved dispersibility in the cellulose acetate propionate or cellulose acetate.

The values of solubility parameter (SP value) are ones calculated by Fedor's method. Specifically, the solubility parameter (SP value) is calculated using the following equation in accordance with *Polym. Eng. Sci.*, vol. 14, p. 147 (1974). Equation: SP value=$\sqrt{(Ev/v)}=\sqrt{(\Sigma\Delta ei/\Sigma\Delta vi)}$ (wherein Ev is vaporization energy (cal/mol); v is molar volume (cm$^3$/mol); $\Delta$ei is vaporization energy of each atom or each group of atoms; and $\Delta$vi is molar volume of each atom or each group of atoms).

Although the unit of solubility parameter (SP value) is (cal/cm$^3$)$^{1/2}$, the unit is omitted in accordance with general practice to show dimensionless values.

Specific examples of the polyetherester compounds are shown below, but the polyetherester compounds are not limited to the following examples.

acids, and lower (e.g., $C_{1-5}$) alkyl esters of these acids. One polyvalent carboxylic acid may be used alone, or two or more polyvalent carboxylic acids may be used in combination.

Specific examples of the polyester polyols include "Polylite" series, manufactured by DIC Corp.

In the case where a resin composition according to exemplary embodiment contains a plasticizer, the mass ratio (A)/(C) of the mass (A) of the cellulose acetate propionate or the cellulose acetate to the mass (C) of the plasticizer is desirably from 6 to 20, from the standpoints of easily obtaining molded resin objects excellent in terms of tensile modulus and impact strength and of easily obtaining molded resin objects inhibited from dimensionally changing upon water absorption. The mass ratio (A)/(C) is preferably from 10 to 20.

In the case where the resin compositions according to exemplary embodiment contain a plasticizer, the content thereof based on the whole resin composition is not particularly limited. The content of the plasticizer based on the whole resin composition is desirably up to 20% by mass (preferably up to 10% by mass, more preferably up to 5% by mass), from the standpoint that the resin compositions, although containing a plasticizer, easily give molded resin objects excellent in terms of tensile modulus and impact strength or easily give molded resin objects inhibited from dimensionally changing upon water absorption. From the

| | $R^{EE1}$ | $R^{EE2}$ | $A^{EE1}$ | $A^{EE2}$ | Mw | Viscosity (25° C.) | APHA | SP value |
|---|---|---|---|---|---|---|---|---|
| PEE1 | —(CH$_2$)$_6$— | —(CH$_2$)$_4$— | phenyl | phenyl | 550 | 43 | 120 | 9.7 |
| PEE2 | —(CH$_2$)$_2$— | —(CH$_2$)$_4$— | phenyl | phenyl | 570 | 44 | 115 | 9.4 |
| PEE3 | —(CH$_2$)$_{10}$— | —(CH$_2$)$_4$— | phenyl | phenyl | 520 | 48 | 110 | 10.0 |
| PEE4 | —(CH$_2$)$_6$— | —(CH$_2$)$_2$— | phenyl | phenyl | 550 | 43 | 115 | 9.3 |
| PEE5 | —(CH$_2$)$_6$— | —(CH$_2$)$_{10}$— | phenyl | phenyl | 540 | 45 | 115 | 10.1 |
| PEE6 | —(CH$_2$)$_6$— | —(CH$_2$)$_4$— | t-butyl | t-butyl | 520 | 44 | 130 | 9.7 |
| PEE7 | —(CH$_2$)$_6$— | —(CH$_2$)$_4$— | phenyl | phenyl | 460 | 45 | 125 | 9.7 |
| PEE8 | —(CH$_2$)$_6$— | —(CH$_2$)$_4$— | phenyl | phenyl | 630 | 40 | 120 | 9.7 |
| PEE9 | —(CH$_2$)$_6$— | —(CH$_2$)$_4$— | phenyl | phenyl | 420 | 43 | 135 | 9.7 |
| PEE10 | —(CH$_2$)$_6$— | —(CH$_2$)$_4$— | phenyl | phenyl | 670 | 48 | 105 | 9.7 |
| PEE11 | —(CH$_2$)$_6$— | —(CH$_2$)$_4$— | phenyl | phenyl | 550 | 35 | 130 | 9.7 |
| PEE12 | —(CH$_2$)$_6$— | —(CH$_2$)$_4$— | phenyl | phenyl | 550 | 49 | 125 | 9.7 |
| PEE13 | —(CH$_2$)$_6$— | —(CH$_2$)$_4$— | phenyl | phenyl | 550 | 32 | 120 | 9.7 |
| PEE14 | —(CH$_2$)$_6$— | —(CH$_2$)$_4$— | phenyl | phenyl | 550 | 53 | 105 | 9.7 |
| PEE15 | —(CH$_2$)$_6$— | —(CH$_2$)$_4$— | phenyl | phenyl | 550 | 43 | 135 | 9.7 |
| PEE16 | —(CH$_2$)$_6$— | —(CH$_2$)$_4$— | phenyl | phenyl | 550 | 43 | 105 | 9.7 |
| PEE17 | —(CH$_2$)$_6$— | —(CH$_2$)$_4$— | phenyl | phenyl | 550 | 43 | 150 | 9.7 |
| PEE18 | —(CH$_2$)$_6$— | —(CH$_2$)$_4$— | phenyl | phenyl | 550 | 43 | 95 | 9.7 |

—Polyester Polyols—

The polyester polyols may be, for example, compounds obtained by reacting a polyhydric alcohol ingredient with a polyvalent carboxylic acid ingredient. The polyester polyols may be compounds obtained by reacting a polyhydric alcohol ingredient with the anhydride of a polyvalent carboxylic acid or with a lower (e.g., $C_{1-5}$) alkyl ester of a polybasic acid.

Examples of the polyhydric alcohol ingredient include ethylene glycol, 1,2-propylene glycol, 1,3-propylene glycol, 1,4-butanediol, 1,4-butenediol, 1,5-pentanediol, 1,6-hexanediol, 1,9-nonanediol, 1,10-decanediol, methylpentanediol, diethylene glycol, triethylene glycol, and neopentyl glycol. One polyhydric alcohol may be used alone, or two or more polyhydric alcohols may be used in combination.

Examples of the polyvalent carboxylic acid ingredient include maleic acid, fumaric acid, succinic acid, adipic acid, sebacic acid, azelaic acid, 1,10-decanedicarboxylic acid, phthalic acid, terephthalic acid, isophthalic acid, naphthalenedicarboxylic acid, and the like, the anhydrides of these same standpoint, the plasticizer content may be 0% by mass. The expression "0% by mass" means that the resin composition contains no other ingredients. In cases when the plasticizer content is within that range, the plasticizer is apt to be inhibited from bleeding.

(Other Ingredients Other than Plasticizers)

The resin compositions according to exemplary embodiment may contain ingredients other than those described above, according to need. Examples of the other ingredients include flame retardants, compatibilizing agents, antioxidants, release agents, light stabilizers, weathering stabilizers, colorants, pigments, modifiers, dripping inhibitors, antistatic agents, hydrolysis inhibitors, fillers, and reinforcements (glass fibers, carbon fibers, talc, clay, mica, glass flakes, milled glass, glass beads, crystalline silica, alumina, silicon nitride, aluminum nitride, and boron nitride).

Ingredients (additives) such as an acid-receiving agent or reactive trapping agent for preventing the release of acetic acid may be added according to need. Examples of the acid-receiving agent include: oxides such as magnesium oxide and aluminum oxide; metal hydroxides such as magnesium hydroxide, calcium hydroxide, aluminum hydroxide, and hydrotalcite; calcium carbonate; and talc.

Examples of the reactive trapping agent include epoxy compounds, acid anhydride compounds, and carbodiimide.

The content of each of these ingredients is preferably from 0% by mass to 5% by mass based on the whole resin composition. The expression "0% by mass" herein means that the resin composition contains no other ingredients.

The resin compositions according to exemplary embodiment may contain resins other than the resins described above (cellulose acetate propionate, cellulose acetate, and specific cellulose fibers). In the case where other resins are contained, the content of the other resins is desirably 5% by mass or less, preferably less than 1% by mass, based on the whole resin composition. It is more preferable that the resin compositions contain no other resins (i.e., 0% by mass).

Examples of the other resins include conventionally known thermoplastic resins. Specific examples thereof include: polycarbonate resins; polypropylene resins; polyester resins; polyolefin resins; polyester carbonate resins; poly(phenylene ether) resins; poly(phenylene sulfide) resins; polysulfone resins; polyethersulfone resins; polyarylene resins; polyetherimide resins; polyacetal resins; poly(vinyl acetal) resins; polyketone resins; polyetherketone resins; polyetheretherketone resins; polyarylketone resins; polyethernitrile resins; liquid-crystal resins; polybenzimidazole resins; poly(parabanic acid) resins; vinyl polymers or copolymers obtained by polymerizing or copolymerizing one or more vinyl monomers selected from the group consisting of aromatic alkenyl compounds, methacrylic acid esters, acrylic acid esters, and vinyl cyanide compounds; diene/aromatic alkenyl compound copolymers; vinyl cyanide/diene/aromatic alkenyl compound copolymers; aromatic alkenyl compound/diene/vinyl cyanide/N-phenylmaleimide copolymers; vinyl cyanide/(ethylene-diene-propylene (EPDM))/aromatic alkenyl compound copolymers; vinyl chloride resins; and chlorinated vinyl chloride resins. Examples of the other resins further include butadiene/methyl methacrylate copolymers of the core-shell type. One of these resins may be used alone, or two or more thereof may be used in combination.

[Processes for Producing the Resin Compositions]

The resin compositions according to exemplary embodiment include, for example, a step in which a resin composition including cellulose acetate propionate or cellulose acetate and further including specific cellulose fibers is prepared.

The resin compositions according to exemplary embodiment are each produced by melt-kneading a mixture including cellulose acetate propionate or cellulose acetate, specific cellulose fibers, and optionally used ingredients, e.g., a plasticizer.

A resin composition according to exemplary embodiment may be produced by a method in which specific cellulose fibers are mixed beforehand with cellulose acetate propionate to obtain a mixture (specific-cellulose-fiber masterbatch) and this mixture is mixed with cellulose acetate propionate.

Cellulose acetate may be directly melt-kneaded together with specific cellulose fibers. Alternatively, use may be made of a method in which specific cellulose fibers are mixed beforehand with cellulose acetate to obtain a mixture (specific-cellulose-fiber masterbatch) and this mixture is melt-kneaded together with cellulose acetate.

Examples of means for the melt kneading include known means. Specific examples thereof include twin-screw extruders, Henschel mixers, Banbury mixers, single-screw extruders, multi-screw extruders, and co-kneaders.

<Molded Resin Objects>

The molded resin objects according to exemplary embodiment include the resin compositions according to exemplary embodiment. That is, the molded resin objects according to exemplary embodiment have the same makeups as the resin compositions according to exemplary embodiment.

A preferred molding method for producing the molded resin objects according to exemplary embodiment is injection molding, from the standpoint of a high degree of freedom of shape. From this standpoint, it is preferable that the molded resin objects are injection-molded objects, obtained by injection molding.

The cylinder temperature in the injection molding is, for example, 200 to 300° C., preferably 240 to 280° C. The mold temperature in the injection molding is, for example, 40 to 90° C., more preferably 60 to 80° C.

The injection molding may be conducted using a commercial device such as, for example, NEX500, manufactured by Nissei Plastic Industries, NEX150, manufactured by Nissei Plastic Industries, NEX70000, manufactured by Nissei Plastic Industries, PNX40, manufactured by Nissei Plastic Industries, or SE50D, manufactured by Sumitomo Industries.

Molding methods for obtaining the molded resin objects according to exemplary embodiment are not limited to the injection molding. For example, use can be made of extrusion molding, blow molding, hot-press forming, calendering, coating, casting, dipping, vacuum forming, and transfer molding.

The molded resin objects according to exemplary embodiment are suitable for use in applications such as electronic/electric appliances, business machines, domestic electrical products, automotive interior trim materials, and containers. More specific examples include: the housings of electronic/electrical appliances and of domestic electrical products; various components for electronic/electrical appliances and domestic electrical products; interior trim components for motor vehicles; container cases for CD-ROMs, DVDs, etc.; tableware; beverage bottles; food trays; wrapping materials; films; and sheets.

EXAMPLES

The present invention is explained below in more detail by reference to Examples, but the invention should not be construed as being limited to the following Examples. Unless otherwise indicated, "parts" means "parts by mass".

<Preparation of Cellulose Acetate Propionates>

(Preparation of Cellulose Acetate Propionates (CAP1 to CAP3))

The following three commercial cellulose acetate propionates are prepared.

CAP-482-0.5 is prepared as cellulose acetate propionate (CAP1), CAP504-0.2 is prepared as cellulose acetate propionate (CAP2), and CAP482-20 is prepared as cellulose acetate propionate (CAP3) (each manufactured by Eastman Chemical Ltd.).

(Synthesis of Cellulose Acetate Propionate (CAP4))

Acylation: Into a reaction vessel are introduced 3 parts of a cellulose powder (KC FLOCK W50, manufactured by Nippon Paper Chemicals Co., Ltd.), 0.15 parts of sulfuric acid, 30 parts of acetic acid, 0.09 parts of acetic anhydride, and 1.5 parts of propionic anhydride. The contents are stirred at 20° C. for 4 hours.

Washing: After completion of the stirring, the powder is washed with pure water using a filter press (SF(PP), manufactured by Kurita Machinery Co., Ltd.) until the electrical conductivity decreases to 50 µS or less, and is then dried.

Post-treatment: To 3 parts of the dried white powder are added 0.2 parts of calcium acetate and 30 parts of pure water. This mixture is stirred at 25° C. for 2 hours and then filtered. The powder obtained is dried at 60° C. for 72 hours, thereby obtaining about 2.5 parts of cellulose acetate propionate (CAP4).

(Synthesis of Cellulose Acetate Propionate (CAP5))

The same procedure as for synthesizing (CAP4) is conducted, except that the amount of the propionic anhydride to be used for the acylation is changed from 1.5 parts to 4 parts and that the reaction temperature and the reaction time are changed to 60° C. and 10 hours, respectively. Thus, cellulose acetate propionate (CAP5) is obtained.

(Synthesis of Cellulose Acetate Propionate (CAP6))

The same procedure as for synthesizing (CAP4) is conducted, except that the amount of the propionic anhydride to be used for the acylation is changed from 1.5 parts to 2 parts and that the reaction temperature and the reaction time are changed to 20° C. and 1 hours, respectively. Thus, cellulose acetate propionate (CAP6) is obtained.

(Synthesis of Cellulose Acetate Propionate (CAP7))

The same procedure as for synthesizing (CAP4) is conducted, except that the amount of the propionic anhydride to be used for the acylation is changed from 1.5 parts to 2 parts and that the reaction temperature and the reaction time are changed to 80° C. and 15 hours, respectively. Thus, cellulose acetate propionate (CAP7) is obtained.

<Determination of Degree of Polymerization and Contents of Propionyl Groups, Etc.>

Each cellulose acetate propionate is examined for the degree of polymerization and the contents of acetyl groups, propionyl groups, and hydroxyl groups based on the cellulose acetate propionate, by the methods described hereinabove. The results thereof are summarized in Table 1.

TABLE 1

| Cellulose acylate No. | Acetyl group (mass %) | Propionyl group (mass %) | Hydroxyl group (mass %) | Degree of polymerization |
|---|---|---|---|---|
| CAP1 | 2.5 | 45 | 2.5 | 55 |
| CAP2 | 0.6 | 42.5 | 5 | 590 |
| CAP3 | 1.3 | 48 | 1.7 | 480 |
| CAP4 | 2 | 38 | 4 | 150 |
| CAP5 | 1.5 | 52 | 0.9 | 880 |
| CAP6 | 2 | 42 | 4 | 45 |
| CAP7 | 2 | 42 | 4 | 920 |

<Preparation of Cellulose Fiber Dispersions>
(Production of Dispersion of Cellulose Fibers CF1)

A cellulose powder (KC FLOCK W-400G, manufactured by Nippon Paper Chemicals Co., Ltd.; average particle diameter, 24 µm) is added in an amount of 1.5 kg (absolute dry weight) to 50 L of an aqueous solution containing, dissolved therein, 7 g (0.5 mmol) of TEMPO (manufactured by Sigma Aldrich) and 75.5 g (7 mmol) of sodium bromide. The resultant mixture is stirred until the cellulose powder comes into an approximately evenly dispersed state. To the reaction system is added 5 L of an aqueous sodium hypochlorite solution (effective chlorine, 5%). Thereafter, the pH is adjusted to 10.3 with 0.5 N aqueous hydrochloric acid solution to initiate an oxidation reaction. During the reaction, 0.5 N aqueous sodium hydroxide solution is gradually added to keep the pH at 10. The reaction is conducted for 2 hours. Thereafter, the oxidized cellulose powder is separated by centrifuging (6,000 rpm, 30 minutes, 20° C.) and washed with water. A 2% (weight/volume) slurry of the oxidized cellulose powder is treated with a mixer at 12,000 rpm for 15 minutes and further treated five times with an extra-high-pressure homogenizer at a pressure of 140 MPa. Thus, a transparent gel-state CF1 dispersion is obtained.

(Production of Dispersion of Cellulose Fibers CF2)

A transparent gel-state CF2 dispersion is obtained in the same manner as for the CF1 dispersion, except that the treatment of the cellulose powder slurry with the extra-high-pressure homogenizer is conducted five times at a pressure of 120 MPa.

(Production of Dispersion of Cellulose Fibers CF3 to Dispersion of Cellulose Fibers CF6)

Transparent gel-state CF3 dispersion, CF4 dispersion, CF5 dispersion, and CF6 dispersion are obtained in the same manner as for the CF1 dispersion, except that the addition amount of TEMPO is changed to 30, 50, 80, and 120 mg, respectively.

(Preparation of Dispersion of Cellulose Fibers CF7)

A commercial 2% by mass aqueous cellulose fiber dispersion (BiNFi-s, manufactured by Sugino Machine) is prepared as a CF7 dispersion.

<Production of Cellulose Fiber Dispersion Masterbatches>

The medium of each of the CF1 dispersion to CF7 dispersion is changed from water to tetrahydrofuran in five steps. Thereto is added 5 parts of cellulose acetate propionate CAP1. The resultant mixture is stirred, and after the cellulose acetate has dissolved, this mixture is dropped into 100 parts of ethanol. The insoluble matter obtained is taken out by filtration and dried. Thus, cellulose fiber masterbatches CFMB1 to CFMB7 are obtained, in which CF1 to CF7 are respectively dispersed in a solid concentration of 30% by mass.

<Preparation of Other Additives>
(Preparation of Other Additives (PR1) to (PR5))

The plasticizers shown in Table 2 are prepared as other additives.

TABLE 2

| Plasticizer No. | Compound | Product name | Manufacturer |
|---|---|---|---|
| PR1 | adipic acid diester | Daifatty-101 | Daihachi Chemical |
| PR2 | poly(adipic acid ester) | Polycizer W-230-H | DIC |
| PR3 | polyetherester compound | ADK Cizer RS-1000 | ADEKA |
| PR4 | polyester polyol | Polylite OD-X2420 | DIC |
| PR5 | dioctyl adipate | ODA | Mitsubishi Chemical |

Examples 1 to 28 and Comparative Examples 1 to 4 and 8

—Kneading and Injection Molding—

In accordance with each of the recipes shown in Table 3, ingredients are kneaded with a twin-screw kneader (TEX41SS, manufactured by Toshiba Machine), in which the cylinder temperature is regulated as shown in Table 3, to obtain a resin composition (pellets).

The pellets obtained are injection-molded using an injection molding machine (NEX140III, manufactured by Nissei Plastic Industries) at such a cylinder temperature that the injection peak pressure does not exceed 180 MPa, thereby molding ISO multipurpose dumbbells (measuring-portion width, 10 mm; thickness, 4 mm) and D2 test pieces (60 mm×60 mm; thickness, 2 mm).

Comparative Example 5

Softwood kraft pulp NDP-T (manufactured by Nippon Paper Chemicals) is pulverized in water medium with a high-pressure homogenizer until the average fiber diameter decreases to 1 µm or less. Thereafter, the resultant aqueous suspension is treated with a grinder ("KM1-10", manufactured by Kurita Machinery Mfg.) by passing the aqueous suspension through the space between disks which are rotating at 1,200 rpm and are in the state of being nearly in contact with each other, from the center toward the periphery 30 times (30 passes). The suspension obtained is temporarily dried, and the bulk cellulose is added to methylene chloride, fibrillated with a high-pressure homogenizer, and further subjected to a dispersing treatment with a bead disperser employing zirconia beads having an average particle diameter of 2 µm. The zirconia beads are removed by centrifuging and filtration, thereby obtaining a methylene chloride dispersion of cellulose nanofibers. Some of this dispersion is taken out, and the methylene chloride is vaporized. Thereafter, a hundred cellulose nanofibers are examined with an electron microscope. As a result, the cellulose nanofibers are found to have an average fiber diameter of 150 nm and an average fiber length of 450 nm. The dispersion obtained is concentrated so as to result in a solid concentration of 50% by mass.

—Preparation of Additive Liquid A—

Cellulose acetate (degree of acetyl group substitution, 60.3%): 4 kg
Methylene chloride: 76 kg
Tinuvin 326 (manufactured by BASF): 3 kg
Tinuvin 109 (manufactured by BASF): 4 kg
Tinuvin 171 (manufactured by BASF): 4 kg The materials are introduced into a closed vessel and dissolved with heating and stirring, and the resultant solution is filtered. Thereto is added, with stirring, 4.4 kg of the cellulose nanofiber dispersion obtained above. This mixture is stirred for further 30 minutes and then filtered. Thus, an additive liquid A is prepared.

—Preparation of Dope A—

Triphenyl phosphate: 15 kg
Ethyl phthalyl ethyl glycolate: 5 kg
Methylene chloride: 640 kg
Ethanol: 120 kg
Cellulose acetate (degree of acetyl group substitution, 60.3%): 220 kg The materials are successively introduced, with stirring, into a closed vessel and dissolved or mixed with heating and stirring. The additive liquid A is added to and mixed with the dope thus obtained. The resultant mixture is cooled to a temperature at which the mixture is flowable, and is allowed to stand still overnight to conduct degassing. Thereafter, the mixture is filtered with Azumi Filter Paper No. 244, manufactured by Azumi Filter Paper Co., Ltd., thereby obtaining a dope A. The dope A obtained is filtered. The dope A contains cellulose nanofibers in a concentration of 1% by mass.

—Kneading and Injection Molding—

The dope A which has been filtered is kneaded with a twin-screw kneader (TEX41SS, manufactured by Toshiba Machine) to obtain a resin composition (pellets).

The pellets obtained are injection-molded using an injection molding machine (NEX140III, manufactured by Nissei Plastic Industries) at such a cylinder temperature that the injection peak pressure does not exceed 180 MPa, thereby molding ISO multipurpose dumbbells (measuring-portion width, 10 mm; thickness, 4 mm) and D2 test pieces (60 mm×60 mm; thickness, 2 mm).

Comparative Example 6

A resin composition is obtained and injection-molded in the same manners as in Comparative Example 5, except that the ratio in which the additive liquid A and dope A prepared in Comparative Example 5 are mixed together is changed so that the concentration of cellulose nanofibers in the resultant dope A is 5% by mass.

Comparative Example 7

The branches and roots are removed from common Japanese bamboos produced in Japan, and the trunks are mechanically crushed, treated with boiling water for 30 minutes, subsequently treated with a high-pressure homogenizer and a grinder in the same manner as in Comparative Example 5, and dried temporarily. Thereafter, the dried cellulose fibers are transferred to a methylene chloride system and subjected to a treatment with a homogenizer and a dispersing treatment with beads, thereby obtaining a dispersion of cellulose nanofibers.

Subsequently, this dispersion of cellulose nanofibers is used to prepare an additive liquid B and a dope B in the same manners as for the additive A and the dope A in Comparative Example 5 and Comparative Example 6, except that the additive liquid B is added in such an amount as to result in a cellulose nanofiber concentration of 10% by mass.

A resin composition is obtained and injection-molded in the same manner as in Comparative Example 5. [Evaluation]

—Evaluation of Tensile Modulus—

The multipurpose dumbbells obtained are examined for tensile modulus using a universal tester (Autograph AG-Xplus, manufactured by Shimadzu Corp.) by a method according to ISO 527. The results thereof are summarized in Table 4.

—Charpy Impact Strength—

The ISO multipurpose dumbbells obtained are processed with a notching tool (notching device manufactured by Toyo Seiki Ltd.) to obtain notched impact specimens, which are examined with an impact strength tester (Charpy Auto Impact Tester CHN3 Type DG-UB, manufactured by Toyo Seiki Ltd.) by a method according to ISO-179-1. The results thereof are summarized in Table 4.

—Total Light Transmittance—

The D2 test pieces obtained are examined for total light transmittance with a hazeometer (NDH7000, manufactured by Nippon Denshoku Kogyo) by a method according to JIS K7361. The results thereof are summarized in Table 4.

—Degree of Oxidation of Glucose Primary Hydroxyl Groups of Cellulose Fibers into Carboxylic Acid, and Fiber Diameter—

The degree of oxidation, into a carboxylic acid, of primary hydroxyl groups of the glucose moieties of the cellulose fibers in each resin composition and the fiber diameter of the cellulose fibers are determined by the methods described hereinabove.

TABLE 3

| | | Makeup (amount being parts by mass) | | | | | | | | | |
|---|---|---|---|---|---|---|---|---|---|---|---|
| | AC (A) | | CF (B) | | | Plasticizer (C) | | Cylinder temperature (° C.) | | Cellulose fibers | |
| | | | King of CFMB | | Mass ratio (A)/(B) | | Mass ratio (A)/(C) | | | Degree of oxidation (%) | Fiber diameter (nm) |
| Sorting | Kind | Amount | (A)/(B) = 7/3 | Amount | | Kind | Amount | Kneading | Injection molding | | |
| Ex. 1 | CAP1 | 90 | CFMB1 | 10 | 32 | PR5 | 8 | 12.1 | 190 | 200 | 98 | 4.5 |
| Ex. 2 | CAP2 | 90 | CFMB1 | 10 | 32 | PR5 | 8 | 12.1 | 190 | 200 | 98 | 4.5 |
| Ex. 3 | CAP3 | 90 | CFMB1 | 10 | 32 | PR5 | 8 | 12.1 | 190 | 200 | 98 | 4.5 |
| Ex. 4 | CAP4 | 90 | CFMB1 | 10 | 32 | PR5 | 8 | 12.1 | 200 | 210 | 98 | 4.5 |
| Ex. 5 | CAP5 | 90 | CFMB1 | 10 | 32 | PR5 | 8 | 12.1 | 200 | 210 | 98 | 4.5 |
| Ex. 6 | CAP6 | 90 | CFMB1 | 10 | 32 | PR5 | 8 | 12.1 | 200 | 210 | 98 | 4.5 |
| Ex. 7 | CAP7 | 90 | CFMB1 | 10 | 32 | PR5 | 8 | 12.1 | 200 | 210 | 98 | 4.5 |
| Ex. 8 | CAP3 | 90 | CFMB2 | 10 | 32 | PR5 | 8 | 12.1 | 190 | 200 | 98 | 6.0 |
| Ex. 9 | CAP3 | 90 | CFMB4 | 10 | 32 | PR5 | 8 | 12.1 | 190 | 200 | 97 | 7.5 |
| Ex. 10 | CAP3 | 90 | CFMB5 | 10 | 32 | PR5 | 8 | 12.1 | 190 | 200 | 98 | 1.2 |
| Ex. 11 | CAP3 | 99.6 | CFMB1 | 0.4 | 832 | PR5 | 8 | 12.5 | 190 | 200 | 98 | 4.5 |
| Ex. 12 | CAP3 | 70 | CFMB1 | 30 | 10 | PR5 | 8 | 11.4 | 190 | 200 | 98 | 4.5 |
| Ex. 13 | CAP3 | 99.7 | CFMB1 | 0.3 | 1110 | PR5 | 8 | 12.5 | 190 | 200 | 98 | 4.5 |
| Ex. 14 | CAP3 | 65 | CFMB1 | 35 | 8.5 | PR5 | 8 | 11.2 | 190 | 200 | 98 | 4.5 |
| Ex. 15 | CAP3 | 90 | CFMB1 | 10 | 32 | PR1 | 8 | 12.1 | 200 | 210 | 98 | 4.5 |
| Ex. 16 | CAP3 | 90 | CFMB1 | 10 | 32 | PR2 | 8 | 12.1 | 200 | 210 | 98 | 4.5 |
| Ex. 17 | CAP3 | 90 | CFMB1 | 10 | 32 | PR3 | 8 | 12.1 | 200 | 210 | 98 | 4.5 |
| Ex. 18 | CAP3 | 90 | CFMB1 | 10 | 32 | PR4 | 8 | 12.1 | 200 | 200 | 98 | 4.5 |
| Ex. 19 | CAP3 | 90 | CFMB1 | 10 | 32 | — | — | — | 210 | 220 | 98 | 4.5 |
| Ex. 20 | CAP3 | 90 | CFMB1 | 10 | 32 | PR1 | 18 | 5.4 | 200 | 210 | 98 | 4.5 |
| Ex. 21 | CAP3 | 90 | CFMB1 | 10 | 32 | PR1 | 5 | 19.4 | 190 | 200 | 98 | 4.5 |
| Ex. 22 | CAP3 | 90 | CFMB1 | 10 | 32 | PR1 | 4 | 24.3 | 190 | 200 | 98 | 4.5 |
| Ex. 23 | CAP3 | 98 | CFMB1 | 2 | 166 | PR1 | 15 | 6.6 | 200 | 210 | 98 | 4.5 |
| Ex. 24 | CAP3 | 98 | CFMB1 | 2 | 166 | — | — | — | 210 | 220 | 98 | 4.5 |
| Ex. 25 | CAP3 | 96.5 | CFMB1 | 3.5 | 94 | — | — | — | 210 | 220 | 98 | 4.5 |
| Ex. 26 | CAP3 | 95 | CFMB1 | 5 | 66 | — | — | — | 210 | 220 | 98 | 4.5 |
| Ex. 27 | CAP3 | 85 | CFMB1 | 15 | 21 | — | — | — | 210 | 220 | 98 | 4.5 |
| Ex. 28 | CAP3 | 75 | CFMB1 | 25 | 12 | — | — | — | 210 | 220 | 98 | 4.5 |
| Comp. Ex. 1 | CAP3 | 90 | CFMB3 | 10 | 32 | PR5 | 8 | 12.1 | 190 | 200 | 97 | 9.0 |
| Comp. Ex. 2 | CAP3 | 90 | CFMB6 | 10 | 32 | PR5 | 8 | 12.1 | 190 | 200 | 98 | 0.7 |
| Comp. Ex. 3 | CAP3 | 90 | CFMB7 | 10 | 32 | PR5 | 8 | 12.1 | 190 | 200 | 0 | 25 |
| Comp. Ex. 4 | CAP3 | 100 | — | — | — | PR1 | 8 | 12.5 | 190 | 220 | — | — |
| Comp. Ex. 5 | makeup after final filtration, in Example 1 of Japanese Patent 4882793 | | | | | | | | 270 | 290 | 0 | 150 |
| Comp. Ex. 6 | makeup after final filtration, in Example 2 of Japanese Patent 4882793 | | | | | | | | 270 | 290 | 0 | 150 |
| Comp. Ex. 7 | makeup after final filtration, in Example 3 of Japanese Patent 4882793 | | | | | | | | 270 | 290 | 0 | 150 |
| Comp. Ex. 8 | CAP3 | 90 | CFMB3 | 10 | 32 | — | — | — | 190 | 200 | 97 | 9.0 |

In Table 3, "AC" denotes cellulose acylate,
"CF" denotes cellulose fibers, and
"CFMB" denotes cellulose fiber dispersion masterbatch.

TABLE 4

| | Evaluation | | |
|---|---|---|---|
| Sorting | Tensile modulus (MPa) | Charpy impact strength (kJ/m$^2$) | Total light transmittance (%) |
| Example 1 | 9530 | 20.5 | 92 |
| Example 2 | 9250 | 19.8 | 91 |
| Example 3 | 9080 | 18.9 | 90 |
| Example 4 | 5330 | 12.1 | 88 |
| Example 5 | 5450 | 11.5 | 88 |
| Example 6 | 5790 | 11.8 | 88 |
| Example 7 | 5390 | 10.9 | 88 |
| Example 8 | 9360 | 18.9 | 90 |
| Example 9 | 9260 | 18.5 | 91 |
| Example 10 | 9090 | 18.7 | 90 |
| Example 11 | 7650 | 16.8 | 91 |
| Example 12 | 15820 | 15.2 | 91 |
| Example 13 | 5650 | 15.5 | 87 |
| Example 14 | 16580 | 10.1 | 88 |
| Example 15 | 9120 | 19.2 | 90 |
| Example 16 | 9350 | 18.5 | 91 |
| Example 17 | 9120 | 18.8 | 90 |
| Example 18 | 9080 | 18.6 | 90 |
| Example 19 | 10500 | 10.2 | 89 |
| Example 20 | 5120 | 24.5 | 88 |
| Example 21 | 9120 | 18.4 | 90 |
| Example 22 | 10000 | 10.6 | 90 |
| Example 23 | 8900 | 22.0 | 90 |
| Example 24 | 10500 | 13.5 | 91 |
| Example 25 | 10800 | 14.2 | 90 |
| Example 26 | 10200 | 13.8 | 90 |
| Example 27 | 10400 | 14.6 | 91 |
| Example 28 | 8900 | 10.8 | 90 |
| Comparative Example 1 | 3890 | 7.8 | 85 |
| Comparative Example 2 | 3950 | 8.2 | 84 |

TABLE 4-continued

| Sorting | Tensile modulus (MPa) | Evaluation Charpy impact strength (kJ/m²) | Total light transmittance (%) |
|---|---|---|---|
| Comparative Example 3 | 3210 | 6.7 | 82 |
| Comparative Example 4 | 1850 | 8.9 | 92 |
| Comparative Example 5 | 3350 | 1.7 | 81 |
| Comparative Example 6 | 3120 | 1.5 | 80 |
| Comparative Example 7 | 3230 | 1.6 | 81 |
| Comparative Example 8 | 3900 | 4.8 | 85 |

The above-recited results show that the Examples according to the present invention give better results in the evaluation of tensile modulus and impact strength than the Comparative Examples.

<Preparation of Cellulose Acetates>

(Synthesis of Cellulose Acetate (CA1))

Acylation: Into a reaction vessel are introduced 3 parts of a cellulose powder (KC FLOCK W50, manufactured by Nippon Paper Chemicals Co., Ltd.), 0.15 parts of sulfuric acid, 30 parts of acetic acid, and 6 parts of acetic anhydride. The contents are stirred at 20° C. for 4 hours.

Deacetylation and Molecular-weight Reduction: Immediately after completion of the stirring, 3 parts of acetic acid and 1.2 parts of pure water are added to the solution which has undergone the acetylation. This mixture is stirred at 20° C. for 30 minutes. After completion of the stirring, 4.5 parts of 0.2 M aqueous hydrochloric acid solution is added, and this mixture is heated to 75° C. and stirred for 5 hours. The resultant solution is dripped into 200 parts of pure water over 2 hours. This mixture is allowed to stand still for 20 hours and then filtered with a filter having a pore diameter of 6 μm. Thus, a white powder is obtained in an amount of 4 parts.

Washing: The white powder obtained is washed with pure water using a filter press (SF(PP), manufactured by Kurita Machinery Co., Ltd.) until the electrical conductivity decreases to 50 μS or less, and is then dried.

Post-treatment: To 3 parts of the dried white powder are added 0.2 parts of calcium acetate and 30 parts of pure water. This mixture is stirred at 25° C. for 2 hours and then filtered. The powder obtained is dried at 60° C. for 72 hours, thereby obtaining about 2.5 parts of cellulose acetate (CA1).

(Synthesis of Cellulose Acetate (CA2))

The same procedure as for CA1 is conducted, except that the amount of the sulfuric acid to be used for the acetylation is changed from 0.15 parts to 0.10 parts. Thus, cellulose acetate (CA2) is obtained.

(Synthesis of Cellulose Acetate (CA3))

The same procedure as for CA1 is conducted, except that the amount of the sulfuric acid to be used for the acetylation is changed from 0.15 parts to 0.01 part. Thus, cellulose acetate (CA3) is obtained.

(Synthesis of Cellulose Acetate (CA4))

The same procedure as for CA1 is conducted, except that the period of stirring in the deacetylation and molecular-weight reduction is changed from 5 hours to 7 hours. Thus, cellulose acetate (CA4) is obtained.

(Synthesis of Cellulose Acetate (CA5))

The same procedure as for CA1 is conducted, except that the period of stirring in the deacetylation and molecular-weight reduction is changed from 5 hours to 4 hours and 30 minutes. Thus, cellulose acetate (CA5) is obtained.

(Synthesis of Cellulose Acetate (CA6))

The same procedure as for CA1 is conducted, except that the solution obtained through the acetylation is allowed to stand at room temperature (25° C.) for 16 hours and then subjected to the deacetylation and molecular-weight reduction. Thus, cellulose acetate (CA6) is obtained.

(Synthesis of Cellulose Acetate (CA7))

The same procedure as for CA1 is conducted, except that the stirring in the deacetylation and molecular-weight reduction is conducted not at 75° C. for 5 hours but at 65° C. for 7 hours. Thus, cellulose acetate (CA7) is obtained.

(Synthesis of Cellulose Acetate (CA8))

The same procedure as for CA1 is conducted, except that the stirring in the deacetylation and molecular-weight reduction is conducted not at 75° C. for 5 hours but at 80° C. for 4 hours. Thus, cellulose acetate (CA8) is obtained.

(Preparation of Cellulose Acetates (CA9) to (CA11))

Commercial cellulose acetate (L50, manufactured by Daicel Ltd.) is prepared as (CA9).

Commercial cellulose acetate (L20, manufactured by Daicel Ltd.) is prepared as (CA10).

Commercial cellulose acetate (LT-35, manufactured by Daicel Ltd.) is prepared as (CA11).

<Determination of Degree of Polymerization and Degree of Acetyl Group Substitution>

The degree of polymerization of each cellulose acetate and the degree of acetyl group substitution of the cellulose acetate are determined by the methods described hereinabove. The results thereof are summarized in Table 5.

TABLE 5

| Cellulose acetate No. | Degree of polymerization | Degree of substitution |
|---|---|---|
| CA1 | 300 | 2.25 |
| CA2 | 160 | 2.20 |
| CA3 | 325 | 2.45 |
| CA4 | 130 | 2.15 |
| CA5 | 350 | 2.55 |
| CA6 | 90 | 2.25 |
| CA7 | 320 | 2.65 |
| CA8 | 250 | 2.05 |
| CA9 | 447 | 2.41 |
| CA10 | 417 | 2.45 |
| CA11 | 400 | 2.95 |

<Preparation of Cellulose Fiber Dispersions>

Dispersions of cellulose fibers CF1 to CF7 are produced or prepared by the methods described above.

<Production of Cellulose Fiber Dispersion Masterbatches>

Cellulose fiber masterbatches CFMB1 to CFMB7 are obtained by the method described above.

<Preparation of Other Additives>

Plasticizers (PR1) to (PR4) shown in Table 2 given above are prepared as other additives.

Examples 29 to 58 and Comparative Examples 9 to 12 and 16

—Kneading and Injection Molding—

In accordance with each of the recipes shown in Table 6, ingredients are kneaded with a twin-screw kneader (TEX41SS, manufactured by Toshiba Machine), in which the cylinder temperature is regulated as shown in Table 6, to obtain a resin composition (pellets).

The pellets obtained are injection-molded using an injection molding machine (NEX140III, manufactured by Nissei Plastic Industries) at such a cylinder temperature that the injection peak pressure does not exceed 180 MPa, thereby molding ISO multipurpose dumbbells (measuring-portion width, 10 mm; thickness, 4 mm) and D2 test pieces (60 mm×60 mm; thickness, 2 mm).

Comparative Example 13

Softwood kraft pulp NDP-T (manufactured by Nippon Paper Chemicals) is pulverized in water medium with a high-pressure homogenizer until the average fiber diameter decreases to 1 μm or less. Thereafter, the resultant aqueous suspension is treated with a grinder ("KM1-10", manufactured by Kurita Machinery Mfg.) by passing the aqueous suspension through the space between disks which are rotating at 1,200 rpm and are in the state of being nearly in contact with each other, from the center toward the periphery 30 times (30 passes). The suspension obtained is temporarily dried, and the bulk cellulose is added to methylene chloride, fibrillated with a high-pressure homogenizer, and further subjected to a dispersing treatment with a bead disperser employing zirconia beads having an average particle diameter of 2 μm. The zirconia beads are removed by centrifuging and filtration, thereby obtaining a methylene chloride dispersion of cellulose nanofibers. Some of this dispersion is taken out, and the methylene chloride is vaporized. Thereafter, a hundred cellulose nanofibers are examined with an electron microscope. As a result, the cellulose nanofibers are found to have an average fiber diameter of 150 nm and an average fiber length of 450 nm. The dispersion obtained is concentrated so as to result in a solid concentration of 50% by mass.

—Preparation of Additive Liquid A—

Cellulose acetate (degree of acetyl group substitution, 60.3%): 4 kg

Methylene chloride: 76 kg

Tinuvin 326 (manufactured by BASF): 3 kg

Tinuvin 109 (manufactured by BASF): 4 kg

Tinuvin 171 (manufactured by BASF): 4 kg

The materials are introduced into a closed vessel and dissolved with heating and stirring, and the resultant solution is filtered. Thereto is added, with stirring, 4.4 kg of the cellulose nanofiber dispersion obtained above. This mixture is stirred for further 30 minutes and then filtered. Thus, an additive liquid A is prepared.

—Preparation of Dope A—

Triphenyl phosphate: 15 kg

Ethyl phthalyl ethyl glycolate: 5 kg

Methylene chloride: 640 kg

Ethanol: 120 kg

Cellulose acetate (degree of acetyl group substitution, 60.3%): 220 kg

The materials are successively introduced, with stirring, into a closed vessel and dissolved or mixed with heating and stirring. The additive liquid A is added to and mixed with the dope thus obtained. The resultant mixture is cooled to a temperature at which the mixture is flowable, and is allowed to stand still overnight to conduct degassing. Thereafter, the mixture is filtered with Azumi Filter Paper No. 244, manufactured by Azumi Filter Paper Co., Ltd., thereby obtaining a dope A. The dope A obtained is filtered. The dope A contains cellulose nanofibers in a concentration of 1% by mass.

—Kneading and Injection Molding—

The dope A which has been filtered is kneaded with a twin-screw kneader (TEX41SS, manufactured by Toshiba Machine) to obtain a resin composition (pellets).

The pellets obtained are injection-molded using an injection molding machine (NEX140III, manufactured by Nissei Plastic Industries) at such a cylinder temperature that the injection peak pressure does not exceed 180 MPa, thereby molding ISO multipurpose dumbbells (measuring-portion width, 10 mm; thickness, 4 mm) and D2 test pieces (60 mm×60 mm; thickness, 2 mm).

Comparative Example 14

A resin composition is obtained and injection-molded in the same manners as in Comparative Example 13, except that the ratio in which the additive liquid A and dope A prepared in Comparative Example 13 are mixed together is changed so that the concentration of cellulose nanofibers in the resultant dope A is 5% by mass.

Comparative Example 15

The branches and roots are removed from common Japanese bamboos produced in Japan, and the trunks are mechanically crushed, treated with boiling water for 30 minutes, subsequently treated with a high-pressure homogenizer and a grinder in the same manner as in Comparative Example 13, and dried temporarily. Thereafter, the dried cellulose fibers are transferred to a methylene chloride system and subjected to a treatment with a homogenizer and a dispersing treatment with beads, thereby obtaining a dispersion of cellulose nanofibers.

Subsequently, this dispersion of cellulose nanofibers is used to prepare an additive liquid B and a dope B in the same manners as for the additive A and the dope A in Comparative Example 13 and Comparative Example 14, except that the additive liquid B is added in such an amount as to result in a cellulose nanofiber concentration of 10% by mass.

A resin composition is obtained and injection-molded in the same manner as in Comparative Example 13.

[Evaluation]

—Determination of Dimensional Change—

The D2 test pieces obtained are allowed to stand still for 24 hours under each of three sets of conditions, i.e., room-temperature (25° C.) conditions, 65° C./85% RH conditions for which a thermo-hygrostatic chamber (THN042PA, manufactured by Advantec) is used, and conditions of standing in 30° C. water, to evaluate the dimensional change through the standing with respect to each of the MD direction (direction of molding), the TD direction (direction perpendicular to the direction of molding), and the thickness direction. The results thereof are summarized in Table 7.

—Flexural Modulus—

The ISO multipurpose dumbbell specimens obtained are examined for flexural modulus using a universal tester (Autograph AG-Xplus, manufactured by Shimadzu Corp.) by a method according to ISO-178. The results thereof are summarized in Table 7.

—Total Light Transmittance—

The D2 test pieces obtained are examined for total light transmittance with a hazemeter (NDH7000, manufactured by Nippon Denshoku Kogyo) by a method according to JIS K7361. The results thereof are summarized in Table 7.

—Degree of Oxidation of Glucose Primary Hydroxyl Groups of Cellulose Fibers into Carboxylic Acid, and Fiber Diameter—

The degree of oxidation, into a carboxylic acid, of primary hydroxyl groups of the glucose moieties of the cellulose fibers in each resin composition and the fiber diameter of the cellulose fibers are determined by the methods described hereinabove.

TABLE 6

| | | CF (B) | | | | | | | Cellulose fibers | |
|---|---|---|---|---|---|---|---|---|---|---|
| | AC (A) | Kind of CFMB (A)/(B) = 7/3 | | Mass ratio (A)/(B) | Plasticizer (C) | | Mass ratio (A)/(C) | Cylinder temperature (° C.) | Degree of oxidation (%) | Fiber diameter (nm) |
| Sorting | Kind Amount | Kind | Amount | | Kind | Amount | | Kneading / Injection molding | | |

| Sorting | Kind | Amount | Kind | Amount | Mass ratio (A)/(B) | Kind | Amount | Mass ratio (A)/(C) | Kneading | Injection molding | Degree of oxidation (%) | Fiber diameter (nm) |
|---|---|---|---|---|---|---|---|---|---|---|---|---|
| Ex. 29 | CA1 | 90 | CFMB1 | 10 | 32 | PR1 | 15 | 6.5 | 220 | 230 | 98 | 4.5 |
| Ex. 30 | CA2 | 90 | CFMB1 | 10 | 32 | PR1 | 15 | 6.5 | 220 | 230 | 98 | 4.5 |
| Ex. 31 | CA3 | 90 | CFMB1 | 10 | 32 | PR1 | 15 | 6.5 | 220 | 230 | 98 | 4.5 |
| Ex. 32 | CA4 | 90 | CFMB1 | 10 | 32 | PR1 | 15 | 6.5 | 220 | 230 | 98 | 4.5 |
| Ex. 33 | CA5 | 90 | CFMB1 | 10 | 32 | PR1 | 15 | 6.5 | 240 | 250 | 98 | 4.5 |
| Ex. 34 | CA6 | 90 | CFMB1 | 10 | 32 | PR1 | 15 | 6.5 | 220 | 230 | 98 | 4.5 |
| Ex. 35 | CA7 | 90 | CFMB1 | 10 | 32 | PR1 | 15 | 6.5 | 240 | 250 | 98 | 4.5 |
| Ex. 36 | CA8 | 90 | CFMB1 | 10 | 32 | PR1 | 15 | 6.5 | 240 | 250 | 98 | 4.5 |
| Ex. 37 | CA9 | 90 | CFMB1 | 10 | 32 | PR1 | 15 | 6.5 | 240 | 250 | 98 | 4.5 |
| Ex. 38 | CA10 | 90 | CFMB1 | 10 | 32 | PR1 | 15 | 6.5 | 240 | 250 | 98 | 4.5 |
| Ex. 39 | CA11 | 90 | CFMB1 | 10 | 32 | PR1 | 15 | 6.5 | 270 | 280 | 98 | 4.5 |
| Ex. 40 | CA1 | 90 | CFMB2 | 10 | 32 | PR1 | 15 | 6.5 | 220 | 230 | 98 | 6.0 |
| Ex. 41 | CA1 | 90 | CFMB4 | 10 | 32 | PR1 | 15 | 6.5 | 220 | 230 | 97 | 7.5 |
| Ex. 42 | CA1 | 90 | CFMB5 | 10 | 32 | PR1 | 15 | 6.5 | 220 | 230 | 98 | 1.2 |
| Ex. 43 | CA1 | 99.6 | CFMB1 | 0.4 | 832 | PR1 | 15 | 6.7 | 220 | 230 | 98 | 4.5 |
| Ex. 44 | CA1 | 70 | CFMB1 | 30 | 10 | PR1 | 15 | 6.1 | 230 | 240 | 98 | 4.5 |
| Ex. 45 | CA1 | 99.7 | CFMB1 | 0.3 | 1110 | PR1 | 15 | 6.7 | 220 | 230 | 98 | 4.5 |
| Ex. 46 | CA1 | 65 | CFMB1 | 35 | 8.5 | PR1 | 15 | 6.0 | 240 | 250 | 98 | 4.5 |
| Ex. 47 | CA1 | 90 | CFMB1 | 10 | 32 | PR2 | 15 | 6.5 | 220 | 230 | 98 | 4.5 |
| Ex. 48 | CA1 | 90 | CFMB1 | 10 | 32 | PR3 | 15 | 6.5 | 220 | 230 | 98 | 4.5 |
| Ex. 49 | CA1 | 90 | CFMB1 | 10 | 32 | PR4 | 15 | 6.5 | 220 | 230 | 98 | 4.5 |
| Ex. 50 | CA1 | 90 | CFMB1 | 10 | 32 | — | — | — | 250 | 260 | 98 | 4.5 |
| Ex. 51 | CA1 | 90 | CFMB1 | 10 | 32 | PR1 | 18 | 5.4 | 220 | 230 | 98 | 4.5 |
| Ex. 52 | CA1 | 90 | CFMB1 | 10 | 32 | PR1 | 5 | 19.4 | 230 | 240 | 98 | 4.5 |
| Ex. 53 | CA1 | 90 | CFMB1 | 10 | 32 | PR1 | 4 | 24.3 | 230 | 240 | 98 | 4.5 |
| Ex. 54 | CA1 | 96 | CFMB1 | 2 | 166 | PR1 | 15 | 6.6 | 210 | 220 | 98 | 4.5 |
| Ex. 55 | CA1 | 98 | CFMB1 | 2 | 166 | — | — | — | 240 | 250 | 98 | 4.5 |
| Ex. 56 | CA1 | 96.5 | CFMB1 | 3.5 | 94 | — | — | — | 240 | 250 | 98 | 4.5 |
| Ex. 57 | CA1 | 95 | CFMB1 | 5 | 66 | — | — | — | 240 | 250 | 98 | 4.5 |
| Ex. 58 | CA2 | 85 | CFMB2 | 15 | 21 | — | — | — | 240 | 250 | 98 | 6.0 |
| Comp. Ex. 9 | CA1 | 90 | CFMB3 | 10 | 32 | PR1 | 15 | 6.5 | 220 | 230 | 97 | 9.0 |
| Comp. Ex. 10 | CA1 | 90 | CFMB6 | 10 | 32 | PR1 | 15 | 6.5 | 220 | 230 | 98 | 0.7 |
| Comp. Ex. 11 | CA1 | 90 | CFMB7 | 10 | 32 | PR1 | 15 | 6.5 | 220 | 230 | 0 | 25 |
| Comp. Ex. 12 | CA1 | 100 | | | — | PR1 | 15 | 6.7 | 220 | 230 | — | — |
| Comp. Ex. 13 | makeup after final filtration, in Example 1 of Japanese Patent 4882793 | | | | | | | | 270 | 290 | 0 | 150 |
| Comp. Ex. 14 | makeup after final filtration, in Example 2 of Japanese Patent 4882793 | | | | | | | | 270 | 290 | 0 | 150 |
| Comp. Ex. 15 | makeup after final filtration, in Example 3 of Japanese Patent 4882793 | | | | | | | | 270 | 290 | 0 | 150 |
| Comp. Ex. 16 | CA1 | 90 | CFMB3 | 10 | 32 | — | — | — | 220 | 230 | 97 | 9.0 |

In Table 6, "AC" denotes cellulose acylate,
"CF" denotes cellulose fibers, and
"CFMB" denotes cellulose fiber dispersion masterbatch.

TABLE 7

| | Dimensional change (%) | | | | | | | | | |
|---|---|---|---|---|---|---|---|---|---|---|
| | Room temperature (25° C.) | | | 65° C./85% RH | | | 30° C./in water | | | Flexural modulus (MPa) | Total light transmittance (%) |
| Sorting | MD | TD | Thickness | MD | TD | Thickness | MD | TD | Thickness | | |
| Ex. 29 | 0.01 | 0.02 | 0.01 | 0.02 | 0.08 | 0.01 | 0.02 | 0.09 | 0.01 | 6800 | 90 |
| Ex. 30 | 0.02 | 0.03 | 0.01 | 0.03 | 0.09 | 0.01 | 0.03 | 0.09 | 0.02 | 6600 | 90 |
| Ex. 31 | 0.01 | 0.03 | 0.01 | 0.02 | 0.08 | 0.01 | 0.02 | 0.09 | 0.01 | 6700 | 89 |
| Ex. 32 | 0.01 | 0.02 | 0.01 | 0.02 | 0.06 | 0.02 | 0.02 | 0.09 | 0.02 | 6800 | 91 |
| Ex. 33 | 0.02 | 0.05 | 0.02 | 0.09 | 0.12 | 0.02 | 0.12 | 0.16 | 0.02 | 6600 | 90 |
| Ex. 34 | 0.02 | 0.07 | 0.02 | 0.11 | 0.14 | 0.02 | 0.19 | 0.28 | 0.02 | 6700 | 89 |
| Ex. 35 | 0.03 | 0.08 | 0.02 | 0.10 | 0.13 | 0.02 | 0.13 | 0.30 | 0.02 | 6800 | 91 |
| Ex. 36 | 0.02 | 0.08 | 0.03 | 0.12 | 0.15 | 0.02 | 0.19 | 0.32 | 0.02 | 6700 | 90 |
| Ex. 37 | 0.02 | 0.08 | 0.01 | 0.06 | 0.12 | 0.02 | 0.11 | 0.15 | 0.02 | 6700 | 90 |
| Ex. 38 | 0.02 | 0.08 | 0.02 | 0.18 | 0.38 | 0.02 | 0.21 | 0.46 | 0.03 | 6500 | 89 |
| Ex. 39 | 0.02 | 0.03 | 0.01 | 0.19 | 0.22 | 0.04 | 0.32 | 0.48 | 0.08 | 6600 | 90 |
| Ex. 40 | 0.01 | 0.02 | 0.01 | 0.02 | 0.09 | 0.01 | 0.03 | 0.09 | 0.01 | 6700 | 90 |

TABLE 7-continued

| Sorting | Dimensional change (%) | | | | | | | | | Flexural modulus (MPa) | Total light transmittance (%) |
| --- | --- | --- | --- | --- | --- | --- | --- | --- | --- | --- | --- |
| | Room temperature (25° C.) | | | 65° C./85% RH | | | 30° C./in water | | | | |
| | MD | TD | Thickness | MD | TD | Thickness | MD | TD | Thickness | | |
| Ex. 41 | 0.02 | 0.03 | 0.01 | 0.03 | 0.09 | 0.01 | 0.03 | 0.09 | 0.02 | 6800 | 90 |
| Ex. 42 | 0.01 | 0.03 | 0.01 | 0.02 | 0.08 | 0.01 | 0.03 | 0.09 | 0.01 | 6700 | 89 |
| Ex. 43 | 0.01 | 0.02 | 0.01 | 0.02 | 0.08 | 0.02 | 0.02 | 0.09 | 0.01 | 6600 | 89 |
| Ex. 44 | 0.02 | 0.04 | 0.01 | 0.03 | 0.08 | 0.02 | 0.02 | 0.08 | 0.01 | 6500 | 90 |
| Ex. 45 | 0.02 | 0.08 | 0.02 | 0.12 | 0.21 | 0.02 | 0.22 | 0.29 | 0.02 | 6600 | 89 |
| Ex. 46 | 0.02 | 0.08 | 0.02 | 0.11 | 0.18 | 0.02 | 0.18 | 0.25 | 0.02 | 6800 | 90 |
| Ex. 47 | 0.01 | 0.03 | 0.01 | 0.02 | 0.07 | 0.01 | 0.02 | 0.09 | 0.01 | 6500 | 91 |
| Ex. 48 | 0.01 | 0.02 | 0.01 | 0.02 | 0.07 | 0.01 | 0.02 | 0.09 | 0.02 | 6700 | 90 |
| Ex. 49 | 0.02 | 0.04 | 0.01 | 0.02 | 0.08 | 0.01 | 0.02 | 0.09 | 0.02 | 6400 | 89 |
| Ex. 50 | 0.02 | 0.04 | 0.02 | 0.08 | 0.12 | 0.02 | 0.11 | 0.18 | 0.02 | 8800 | 91 |
| Ex. 51 | 0.02 | 0.05 | 0.02 | 0.07 | 0.11 | 0.02 | 0.11 | 0.19 | 0.02 | 6600 | 90 |
| Ex. 52 | 0.02 | 0.05 | 0.02 | 0.03 | 0.06 | 0.02 | 0.03 | 0.09 | 0.02 | 6500 | 89 |
| Ex. 53 | 0.02 | 0.08 | 0.03 | 0.11 | 0.20 | 0.03 | 0.18 | 0.35 | 0.05 | 6400 | 90 |
| Ex. 54 | 0.02 | 0.07 | 0.03 | 0.12 | 0.22 | 0.03 | 0.2 | 0.35 | 0.04 | 6500 | 92 |
| Ex. 55 | 0.01 | 0.06 | 0.02 | 0.1 | 0.2 | 0.02 | 0.18 | 0.32 | 0.04 | 8700 | 90 |
| Ex. 56 | 0.02 | 0.06 | 0.02 | 0.08 | 0.18 | 0.03 | 0.19 | 0.35 | 0.03 | 8500 | 90 |
| Ex. 57 | 0.03 | 0.07 | 0.03 | 0.11 | 0.21 | 0.04 | 0.2 | 0.37 | 0.04 | 8300 | 90 |
| Ex. 58 | 0.02 | 0.08 | 0.03 | 0.12 | 0.22 | 0.05 | 0.18 | 0.32 | 0.03 | 8800 | 89 |
| Comp. Ex. 9 | 0.04 | 0.15 | 0.01 | 0.15 | 1.08 | 0.09 | 0.32 | 1.99 | 0.15 | 5800 | 85 |
| Comp. Ex. 10 | 0.04 | 0.14 | 0.01 | 0.15 | 1.05 | 0.08 | 0.34 | 1.95 | 0.12 | 5600 | 84 |
| Comp. Ex. 11 | 0.06 | 0.18 | 0.03 | 0.27 | 1.22 | 0.26 | 0.40 | 2.01 | 0.38 | 5400 | 82 |
| Comp. Ex. 12 | 0.06 | 0.18 | 0.04 | 0.28 | 1.25 | 0.25 | 0.41 | 2.05 | 0.44 | 3400 | 92 |
| Comp. Ex. 13 | 0.12 | 0.22 | 0.08 | 0.31 | 1.38 | 0.33 | 0.65 | 2.36 | 0.52 | 4100 | 81 |
| Comp. Ex. 14 | 0.11 | 0.22 | 0.07 | 0.30 | 1.28 | 0.33 | 0.63 | 2.12 | 0.46 | 4300 | 80 |
| Comp. Ex. 15 | 0.11 | 0.21 | 0.07 | 0.30 | 1.05 | 0.31 | 0.61 | 2.08 | 0.41 | 4200 | 81 |
| Comp. Ex. 16 | 0.05 | 0.18 | 0.03 | 0.18 | 0.99 | 0.12 | 0.55 | 1.95 | 0.2 | 5500 | 85 |

The above-recited results show that the molded resin objects of the Examples according to the present invention have smaller dimensional changes under the 65° C./85% RH conditions and in 30° C. water than the molded resin objects of the Comparative Examples. That is, it may be seen that the molded resin objects of the Examples are more inhibited from dimensionally changing upon water absorption than those of the Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A resin composition comprising:

A cellulose acetate propionate, wherein a content of a propionyl group in the cellulose acetate propionate is 39 to 51% by mass based on the cellulose acetate propionate, and cellulose fibers in which a part or all of primary hydroxyl groups of glucose moieties are oxidized into a carboxylic acid, the cellulose fibers having an average fiber diameter of 1 to 8 nm.

2. The resin composition according to claim 1, wherein the cellulose acetate propionate has a degree of polymerization of 50 to 900.

3. The resin composition according to claim 1, wherein the cellulose fibers are cellulose fibers oxidized using 2,2,6,6-tetramethylpipenidyl-1-oxy radical as a catalyst.

4. The resin composition according to claim 1, wherein a mass ratio (A)/(B) of a mass (A) of the cellulose acetate propionate to mass (B) of the cellulose fibers is from 10 to 1,000.

5. The resin composition according to claim 1 further comprising a plasticizer.

6. The resin composition according to claim 5, wherein a mass ratio (A)/(C) of a mass (A) of the cellulose acetate propionate to mass (C) of the plasticizer is from 6 to 20.

7. The resin composition according to claim 5, wherein the plasticizer is any one compound selected from the group consisting of a compound containing an adipic acid ester, a polyester polyol, and a polyetherester compound.

8. A molded resin object obtained by molding the resin composition according to claim 1.

9. The molded resin object according to claim 8 that is an injection-molded object.

* * * * *